(12) United States Patent
Fliermans et al.

(10) Patent No.: US 6,407,144 B1
(45) Date of Patent: Jun. 18, 2002

(54) COMBINATION BIOLOGICAL AND MICROWAVE TREATMENTS OF USED RUBBER PRODUCTS

(75) Inventors: Carl B. Fliermans, Augusta, GA (US); George G. Wicks, Aiken, SC (US)

(73) Assignee: Westinghouse Savannah River Company, LLC, Aiken, SC (US)

( * ) Notice: Subject to any disclaimer, the term of this patent is extended or adjusted under 35 U.S.C. 154(b) by 0 days.

(21) Appl. No.: 09/542,394

(22) Filed: Apr. 4, 2000

(51) Int. Cl.$^7$ ............................ C08J 11/18; C08J 11/10; C12R 1/01; C08L 21/00
(52) U.S. Cl. .................... 521/41; 522/112; 522/157; 522/158; 522/159; 522/161; 435/4; 435/166; 435/282; 204/157.15; 204/157.6
(58) Field of Search ................................ 525/192–198, 525/212, 240, 241, 331.7–334.1; 523/167; 524/526; 522/109, 110, 112, 151, 157, 158, 159; 521/41; 435/262, 282, 166, 41; 204/157.15, 157.6

(56) References Cited

U.S. PATENT DOCUMENTS

| | | |
|---|---|---|
| 4,104,205 A | 8/1978 | Novotny et al. |
| 4,332,700 A | 6/1982 | Munih |
| 4,341,667 A | 7/1982 | Lal et al. |
| 4,456,688 A | 6/1984 | Dugan et al |
| 4,469,573 A | 9/1984 | Minih |
| 4,469,817 A | 9/1984 | Hayashi et al. |
| 4,647,443 A | 3/1987 | Apffel |
| 4,665,101 A | 5/1987 | Ficker |
| 4,770,741 A | 9/1988 | Day |
| 5,120,767 A | 6/1992 | Allard et al. |
| 5,258,413 A | 11/1993 | Isayev |
| 5,275,948 A | 1/1994 | Straube et al. |
| 5,284,625 A | 2/1994 | Isayev et al. |
| 5,358,869 A | 10/1994 | Kilbane, II |
| 5,362,759 A | 11/1994 | Hunt et al. |
| 5,387,523 A | 2/1995 | Monticello |
| 5,458,752 A | 10/1995 | Lizama et al. |
| 5,506,123 A | 4/1996 | Chieffalo et al. |
| 5,510,265 A | 4/1996 | Monticello |
| H1531 H | 5/1996 | Blumentals et al. |
| 5,578,700 A | 11/1996 | Hunt et al. |
| 5,597,851 A | 1/1997 | Romine et al. |
| 5,849,970 A | 12/1998 | Fall et al. |
| 5,897,996 A | 4/1999 | Kimbara et al. |
| 5,998,490 A | 12/1999 | Serkiz |

FOREIGN PATENT DOCUMENTS

GB    2350839 A    12/2000

OTHER PUBLICATIONS

Section on "Rubber Recycling Emphasis", *Rubber & Plastics News*, Oct. 7, 1996, pp. 9, 11, 12, 13, 15, 16, 18–27.

"Microbial Processing of Waste Tire Rubber", Robert A. Romine, Margaret F. Romine & Lesley Snowden–Swan, Pacific Northwest Laboratories, Richland, WA, presented at the Rubber Division, American Chemical Society, Cleveland, OH, Oct. 17–20, 1995 (15 pages total).

*Primary Examiner*—Susan W. Berman
(74) *Attorney, Agent, or Firm*—Dority & Manning, PA

(57) ABSTRACT

A process and resulting product is provided in which a vulcanized solid particulate, such as vulcanized crumb rubber, has select chemical bonds altered by biotreatment with thermophillic microorganisms selected from natural isolates from hot sulfur springs. Following the biotreatment, microwave radiation is used to further treat the surface and to treat the bulk interior of the crumb rubber. The resulting combined treatments render the treated crumb rubber more suitable for use in new rubber formulations. As a result, larger loading levels and sizes of the treated crumb rubber can be used in new rubber mixtures and good properties obtained from the new recycled products.

10 Claims, No Drawings

COMBINATION BIOLOGICAL AND MICROWAVE TREATMENTS OF USED RUBBER PRODUCTS

The United States Government has rights to this invention pursuant to contract number DE-AC09-96-SR18500 between the U.S. Department of Energy and Westinghouse Savannah River Company.

BACKGROUND OF THE INVENTION

1. Field of the Invention

The present invention relates broadly to the treatment and recycle of rubber products and still more particularly to the use of recycled crumb rubber.

2. Discussion of Background

Existing efforts to recycle used rubber, in particular used tires, into new rubber articles, especially tires, have met with only limited commercial success. In the United States alone, there are currently billions of tires stock-piled in long term storage with additional millions being added annually to such stock piles. Because of the large volume involved with tires, this discussion will be directed to tires although much of these comments are applicable to other new and used rubber products.

Because used rubber is usually processed in the form of crumb rubber, references herein will be to rubber in that form. However, crumb rubber is merely one example of a used rubber product suitable for processing as described herein. An existing limitation in the recycling of used tire material is that the used tire rubber can not be readily mixed in economical proportions to form suitable new tire polymer mixes having acceptable cured properties.

During the vulcanization process of new tires, chemical accelerators, promoters, and/or initiators, are used and large numbers of sulfur cross-links are produced in the vulcanized tire rubber. It is generally believed in the art that the sulfur compounds which are present in used tire rubber render the previously vulcanized rubber unsuitable for incorporation in significant quantities into a new rubber formulation. Reformulation of used tire rubber particles with new polymer materials results in a brittle compound unsuitable for many uses such as automobile or truck tires. Heretofore, many efforts to reclaim scrap rubber have included a physical sheering process which is suitable for a rubber which can be mixed with asphalt, forming asphalt rubber. Such use is taught in U.S. Pat. No. 5,304,576.

It is also known to take used rubber and depolymerize the vulcanized rubber in an organic solvent and then recover various polymerized fractions as taught in U.S. Pat. No. 5,438,078. Similarly, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. U.S. Pat. No. 5,369,215 teaches a similar process in which used tire material may be depolymerized under elevated temperatures and at a reduced pressure to recover the monomeric compounds.

U.S. Pat. No. 4,104,205 teaches a microwave method to devulcanize rubber from hose end trim and butyl tire bladders. While tire tread material was also treated, difficulties in exothermic reactions and physical properties of the microwaved materials were noted.

U.S. Pat. No. 5,891,926, incorporated herein by reference, uses elevated temperatures, pressure, and extracting solvent to recover a vulcanized polymer from cured rubber.

U.S. Pat. No. 4,341,667 teaches that the green strength of elastomers reclaimed through heat, microwave, chemical treatments, or physical shearing can be improved by the addition of butene polymers.

U.S. Pat. No. 4,469,817 teaches the microwave treatment of a vulcanized rubber. The treatment uses microwaves to raise the temperature of the rubber to a devulcanization temperature followed by rapid cooling with water.

U.S. Pat. No. 4,665,101 is an improvement to conventional heating of used rubber where microwave heating is additionally used. The combination of the heating methods is used to provide a more uniform heating profile and avoid extremes of localized temperatures within the treated material.

U.S. Pat. No. 5,275,948, incorporated herein by reference, teaches the use of chemolithotrophic microorganisms to remove sulfur from the surface of finely ground scrap rubber. Preferred organisms include Thiobacillus species which oxidize elemental sulfur to sulfuric acid and which is released into the suspension culture.

U.S. Pat. No. 5,597,851, incorporated herein by reference, teaches the use of microorganisms to desulfurize finely ground rubber particles. Thiobacillus sp. and *Sulfolobus acidocaldarius* are used to bioprocess rubber particles for at least 24 hours but prior to complete oxidation of surface sulfur.

The present application relates to commonly assigned U.S. application having Ser. No. 09/542,744 filed Apr. 4, 2000 entitled "Microbial Processing of Used Rubber" and having Attorney Docket No. WSR-15, and which is incorporated herein by reference. The present application also relates to commonly assigned U.S. patent application Ser. No. 09/542,201 filed Apr. 4, 2000 entitled "Microwave Treatment of Vulcanized Rubber" having Attorney Docket No. WSR-13, and which is incorporated herein by reference. Additional teachings of a surface treatment protocol for the treatment of crumb rubber may be found in the commonly assigned U.S. application bearing U.S. Ser. No. 08/853,130 entitled "Nonaqueous Ozonation of Vulcanized Rubber", now U.S. Pat. No. 5,998,490, and which is incorporated in its entirety herein by reference.

There remains a strong need for a practical, economical system for processing used rubber into a material which can be incorporated at a substantial loading level into new rubber compounding mixtures. There is room for improvement with respect to the existing use and applications of used rubber and to the treatment of used, vulcanized rubber to render the rubber more suitable for high performance products such as tires.

SUMMARY OF THE INVENTION

The present invention is a process and the resulting product of the process in which previously vulcanized rubber may be incorporated into polymer mixes for new rubber products, including tires, at much greater levels than used heretofore. The present invention provides a process and a resulting product of the process wherein previously vulcanized, used crumb rubber has its bulk and surface chemistry altered. The chemical alteration employs separate treatment stages which, in one example, includes the use of bacteria as a biological agent to oxidize the surface of the crumb rubber, along with an additional separate surface and bulk treatment using microwave radiation.

When compared to untreated crumb rubber, or to crumb rubber treated solely with microwave or with biological agents, the combination of the biological and microwave treated crumb rubber has generally improved properties useful for incorporation into new tire or virgin rubber polymer formulations. The improved properties for the composite polymer formulations include plasticity, tensile strength, elongation @ break, and energy @ break. The properties listed above are generally better than the combination of untreated crumb and new tire rubber mix control values when the combination of treated crumb rubber and new tire rubber was analyzed and evaluated in Banbury tests. For some properties, the treated crumb rubber/new rubber mix exceeds a benchmark value seen in a 100 percent new rubber compound.

In accordance with this invention, it has been demonstrated that particles of used crumb rubber can be reacted with active cultures of a bacillus-like bacterium isolated from a natural hot sulfur spring. The preferred isolate shows most favorable growth at 65 degrees C. and has been found to react with S—S, and S—C bonds and provides a more reactive site on the rubber surface. In one embodiment, the bacterium interacts with the surface sulfur constituents and alters the surface chemistry and reactivity of the so treated vulcanized crumb tire rubber. Following the biotreatment, additional treatment protocols using microwave energy are applied which further enhances the end qualities of the crumb rubber particle.

The combination of biological and microwave treatment (hereinafter "tandem treatments") of used rubber particles changes the bulk and surface properties of the crumb rubber particles to an extent that the rubber particles can be integrated into a new tire polymer mix at much higher levels than previously thought feasible. The tandem treatment of the crumb rubber provides a treated rubber product which is compatible with the new rubber polymer component of a tire mix.

The use of the tandem treatment to modify select chemical species present on the surface of the crumb rubber provides a process which can be carried out on an economical basis. The tandem process is thought to be particularly useful in that the combination of separate treatment steps is believed to alter a wider variety of chemical tire/rubber additives than either treatment protocol used as the sole treatment. The ability to alter by surface and bulk treatments the chemical constituents, further enhances the usefulness and compatibility of the treated used rubber with new or virgin polymer. The tandem treatments also provide a more standardized crumb rubber for use in recycling operations, including the incorporation of significant quantities and appreciable sizes of treated crumb rubber into polymer formulations for automobile and truck tires.

The use of the tandem treatments provides the potential of yielding a process and resulting product which can be obtained on an economical basis at a commercial scale and in an environmentally acceptable manner. Further, the elevated temperatures at which the preferred microorganisms operate can be maintained using waste heat which results from any of several steps in the commercial manufacturing of new tires. When the microwave treatment is the final step of the tandem process, the elevated temperatures generated in the crumb rubber help provide a more uniform crumb rubber feed stock. Further, the microwave step also dries the crumb rubber which facilitates the use and handling of the crumb rubber in preparing polymer mixes.

It is thus an object of this invention to provide a tandem process which increases by an effective amount the reactivity of used crumb rubber such that an increased amount of used crumb rubber can be mixed with a new tire polymer mix.

It is another object of this invention to provide a crumb rubber having an improved surface chemistry suitable for use in compounding a new tire rubber mix.

It is still another object of this invention to provide a treated crumb rubber product having a consistent surface chemistry and bulk properties in which polymer degrading constituents have been altered.

It is yet another object of this invention to provide a compounded rubber mix containing large sizes of treated rubber particles.

It is yet another object of this invention to provide a compounded rubber mix containing increased amounts of crumb rubber in the formulation.

It is a further object of this invention to provide a process of devulcanizing a rubber particulate in which the devulcanization is substantially limited to targeted chemical species and bonds which yields beneficial properties in recycled rubber products.

These and other objects of this invention are provided by a process for devulcanizing and/or otherwise conditioning or modifying particulate rubber comprising: providing a supply of crumb rubber, said crumb rubber having a plurality of C—S and S—S bonds; exposing the crumb rubber to microorganisms capable of using surface constituents as metabolic and/or energy sources, thereby oxidizing a first portion of the C—S and S—S bonds; and, exposing further the scrap rubber to microwave radiation and radiant heat, thereby oxidizing a second portion of C—S and S—S bonds; thereby, providing a crumb rubber having a treated surface and improved bulk properties facilitating the formulation and curing of the particulate rubber into a new rubber product.

DETAILED DESCRIPTION OF A PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

As referenced above in the commonly assigned applications, the present inventors have established that the surface of used rubber particles, buffings, and other various sizes and shapes of used rubber may be treated with either microwave radiation or with a selected type of bacterium to generate a rubber particle having a surface interface which is substantially less vulcanized when compared to its untreated state. Further, applicants' co-pending applications set forth compounding studies which establish that both the microwave modified rubber and the biotreated modified rubber, impart useful physical properties to a cured rubber composition when mixed with virgin or unvulcanized rubber.

The present invention is directed to the additional improvements offered by first applying a bacterial surface treatment followed by a microwave treatment process, the microwave treatment improving both the bulk and surface properties of the particulate rubber. Following the sequential treatments, the treated particulate rubber is incorporated into a polymer composition for a cured rubber article.

A process for treating the crumb rubber is based upon the exposure of a previously vulcanized used rubber, such as crumb rubber, to a plurality of microorganisms which targets select chemical bonds. In particular, sulfur-carbon (S—C) and sulfur-sulfur (S—S) bonds on the crumb rubber surface are targeted. Following the biotreatment, the crumb rubber is briefly rinsed and subsequently used as a source material in the microwave treatment process. In addition, the order of treatment may be reversed so that microwave treatment precedes the biotreatment. However, as reported here, the strongest improvement, as evaluated in Banbury mixing and compounding studies with tire tread formulations, occurs when the biotreatment step precedes the microwave treatment step.

The tandem treatment is believed to further improve the neutralization of other constituents added to rubber, such as accelerators, anti-oxidants, and stabilizers. Improved control of these chemical constituents, along with enhanced oxidation of the S—C and S—S bonds, improves the quality of the treated crumb rubber product and enhances its ability to be combined into a new tire or virgin rubber formulation.

In the initial vulcanization of tire rubber, sulfur and sulfur containing compounds such as accelerators and initiators are added which crosslink with the tire polymer. The bonding and crosslinkage stabilizes the polymer matrix, which imparts important desired properties to the rubber and increases the useful life of the tire.

The presence of the sulfur compounds and various additives present within used tire rubber has, in part, limited the quantity of used tire rubber which can be used in new tire mixes. The sulfur containing compounds present on the rubber results in a final product which is often brittle and has other properties which make it unsuitable for many uses and especially for use as a tire.

As used in the present invention, the term "surface devulcanized" is used to indicate that certain surface properties of the particulate crumb rubber have been chemically altered by the application of microorganisms. Additional surface devulcanization and improvements in the bulk properties are obtained by a microwave treatment step. It is believed that the surface and bulk activity of mono, di, and polysulfides which formed polymer cross linkages during the initial vulcanization process have been beneficially altered by the present tandem treatment process. As such, the crumb rubber is referred to here as "devulcanized" though it is understood that a substantial number of vulcanization products persist in the treated crumb rubber and in fact remain beneficial in the overall reformulations of new rubber mixes with the treated crumb rubber. Again, it is to be understood that other chemical and/or physical changes may take place which have a beneficial effect on the used rubber when reformulated as part of a new rubber product or mixture.

The work herein uses a 40 mesh size crumb truck tread rubber conforming to ASTM standard D5603. The crumb rubber was obtained from a commercial supplier of crumb rubber and is believed to represent a heterogenous mixture of different tire formulations from a variety of manufacturers. It is believed that the crumb rubber can be used over a wide range of particulate sizes, and the process is not size dependent solely for the size ranges used in the manufacturing of tires. For example, standard sizes of 200–40 mesh and even larger are believed to be useful.

The ASTM standard crumb rubber material was chosen for its known uniformity. It is readily appreciated by those having ordinary skill in the art that crumb rubber originating from used passenger or truck tires will typically encompass products originating from numerous manufacturers and comprising an enormous assortment of chemical constituents. Accordingly, a wide variety of different chemicals are expected to be present within the crumb rubber. This is particularly true for the reactive sulfur compounds originally added to the rubber during the vulcanization process.

The present invention provides a treatment process which effectively modifies broad classes of reactive chemical constituents associated with the surface and bulk of the crumb rubber. Accordingly, the treatment process will address expected variations encountered in a commercial source of crumb rubber.

The examples below are intended to illustrate the present invention. The descriptions in no way limit the scope of the present invention.

In the examples, the properties of the combination of crumb and new tire rubber samples and appropriate controls are evaluated as follows:

Plasticity:
   Measurements carried out in accordance with ASTM Standard D1646.
Scorch:
   (t5, t35) Measurements carried out in accordance with ASTM Standard D1646.
Minimum Viscosity:
   Measurements carried out in accordance with ASTM Standard D1646.
Shore Hardness:
   Measurements carried out in accordance with ASTM Standard D2240.
Modulus of elongation at 300% and 100%:
   Measurements were carried out in accordance with ASTM Standard D412, test method A.
Tensile Strength:
   Measurements were carried out in accordance with ASTM Standard D412, test method A.
Elongation @ Break:
   Measured as a percentage value according to ASTM standard D412, test method A.
Energy @ Break:
   Measurements carried out in accordance with ASTM Standard D412, test method A as set forth in units of MPa.
G':
   Measurements carried out in accordance with ASTM Standard D2221.
Tan Delta:
   Hysteresis is expressed by the measurement of tan delta @ 10 percent deformation and @ 23 degrees C. in accordance with ASTM Standard D2231.
Analytical Characterization:
   The analytical protocols set forth below are based upon standard ASTM measurements.
   Acetone extract measurements were made according to ASTM Standard D297-18, 19.
   Oxygen measurements were made using commercially available oxygen analyzers.
   Polymer ratios were determined according to ASTM Standard D3677.
   Macro ash measurements were made according to ASTM Standard D297-37.

Biotreatment Protocol

A general protocol for the biotreatments found useful in the present invention is described below. The biotreatments may be used on previously untreated crumb rubber or on crumb rubber previously treated by a microwave devulcanizing process or other pretreatment.

Samples of 40 mesh crumb rubber in 100–1000 gm quantity batches were incubated with log phase cultures of a bacillus-type bacterium isolated from sulfur hot springs. The bacterium used corresponds to culture 157-3 and is available from the inventors at Westinghouse Savannah River Company in Aiken, S.C. The bacteria are thermophilic, chemolithotrophic organisms initially isolated from thermal springs and cultured in a sulfur-based nutritive medium.

At the time of incubation with the crumb rubber, the bacteria are placed in a modified medium of low sulfur concentration to force metabolic degradation of the sulfur bonds and sulfur compounds present on the crumb rubber. The bacteria are mixed with quantity of crumb rubber so as to achieve a concentration (v/v) of 10/40 to 30/40 of microorganisms to crumb rubber. The treatment conditions involved continuous agitation within a bioreactor and at a temperature maintained between 50–70° C. and more preferably within the range of 60 to 65 degrees C. The high temperature treatment conditions used are too extreme for most microorganisms. As a result, aseptic conditions are not required during the treatment protocols. As a result, crumb rubber source material can be used with only minimal washing or pretreatment.

Incubation times of between 2 to 72 hours were evaluated. Results indicate that a treatment interval of 20 hours using a 10/40 v/v of bacterium to crumb rubber provided effective treatment times. Shorter time intervals showed less improvement,. Treatment intervals of up to 72 hours showed no significant differences over the 20 hour treatment results. Accordingly, a 20 hour treatment interval was adopted for the purposes of additional testing and study.

Following the incubation times, the samples were removed by filtration and the crumb rubber was washed with distilled water and air dried. Air drying is not required when the microwave treatment step immediately follows the biotreatment protocol. No visible differences were seen between the treated and untreated crumb rubber samples. The treated samples retained the initial particle size. It was noted that the treated samples had a tendency to clump together when manually pressed. The clumping or "stickiness" has been found indicative of materials which will co-process well with virgin polymer.

Samples were prepared by incorporating the treated samples and appropriate controls into a literature formula tread composition (Bierkes) using a Banbury mixer at conventional temperatures and mixing conditions. Loading levels of treated crumb rubber at 12% and 20% load levels were made by incorporating the treated crumb rubber into a masterbatch mix and mixing the materials in the mill.

For example, a 20% loading of the biotreated crumb rubber utilized a 160 gram loading of treated crumb rubber to 800 grams of masterbatch mix. The physical properties and applicable treatment intervals for the treated crumb and new tire rubber combinations following the initial biotreatment step are set forth in Table 1 along with comparative data for a new tire rubber compound and a compound containing 20% untreated crumb rubber.

Microwave Protocol

A general protocol found useful in the present microwave treatments is described below. Samples of 40 mesh truck tread crumb rubber ranging from 30–300 grams were subjected to power levels of between 10–100% (85–850 Watts) in a 850 Watt, 2450 MHZ microwave oven having the oven cavity lined with refractory materials. In some instances, a susceptor was used to more uniformly heat the crumb rubber. An inert atmosphere of nitrogen gas was used to regulate the treatment process. Temperature levels for the samples treated ranged from room temperature to 500° C.

Following treatment times which varied from 4–60 minutes, the samples were removed and evaluated. The physical properties of the treated crumb rubber ranged from a completely pyrolyzed end product at the extreme time/power levels to the less strenuous treatments which more nearly resembled the starting material. Further analysis was made of samples which retained a substantial particle size and had a tendency to clump together. The clumping or "stickiness" has been found generally to be indicative of materials which will co-process well with new tire or virgin polymer.

A target temperature of 360° C. to 380° C. has been found to be most effective. Such a temperature can be maintained over the treatment time intervals reported above with no apparent loss of desired properties. The 360° C.–380° C. temperature range seems effective at modifying the surface and bulk S—S and C—S bonds within the crumb rubber.

Samples were further evaluated by incorporating the treated samples into a literature formula tread composition (Bierkes) using a Banbury mixture as described above. Loading levels of treated crumb rubber at 12% (not reported) and 20% load levels were made and evaluated using the procedures and protocols described above in reference to the biotreatment. The results are set forth in Table 2.

As shown by the data in Table 2, the compounds evaluated include a new tire rubber having no crumb rubber added, a 20 percent untreated crumb rubber compound, and four (4) different compounds having a 20 percent microwave treated crumb rubber component as treated under various conditions. The crumb rubber used in the evaluations reported in Table 2 is a 40 mesh truck tread crumb rubber. The four (4) microwave treated samples set forth, going from left to right, were treated at a temperature of 360° C. for four (4) minutes, 380° C. for four (4) minutes, 360° C. for eight (8) minutes, and 380° C. for eight (8) minutes, respectively.

Tandem Treatments

The microwave treated used rubber corresponding to sample 403808 (Table 2) and the biotreated used rubber characterized as sample CF83 in Table 1 were each further treated. The crumb rubber initially treated with the biotreatment protocol was further treated with the microwave protocol set forth above. Treatment conditions included a treatment interval of 8 minutes @ 380° C. The tandem treated material was compounded into a cured rubber at a 20% loading level using the Banbury mixer and analytical procedures set forth above. Results are set forth in Table 3 as bio/microwave.

An additional treatment was applied to the material originally treated with microwaves by subsequent biotreatment using the biotreatment protocols set forth above. The biotreatment conditions included a 20-hour incubation time @ 60–65° C. The tandem treated material was compounded into a cured rubber composition at a 20% loading level of the tandem treated material using the Banbury mixer and analytical procedures set forth above. Results are set forth in Table 3 as "microwave/biotreated". Comparative delta values for selected properties are set forth in Table 4. The delta values for Table 4 are calculated as follows:

$$\Delta = \frac{\text{20\% value treated rubber compounds} - \text{20\% value untreated rubber compounds}}{\text{value of new tire rubber compound} - \text{value of 20\% untreated rubber compound}}$$

As shown by the data in Table 3, the blending of 20 percent untreated crumb rubber with new tire rubber results in a rubber compound in which key physical properties are significantly deteriorated. The delta values in Table 4 is the percentage of the loss in properties observed in the untreated crumb rubber compound that is regained in the treated crumb rubber compound. Thus, the delta value of the treated compound that showed no improvement over the untreated compound would be zero percent. The delta value of treated compound that achieved the same properties as all new tire rubber would be 100 percent. Note that the table shows values greater than 100 percent for energy at break, and elongation @ break, indicating that the properties of the treated crumb rubber compound were improved over the properties of the new tire rubber compound having no crumb rubber present.

It should be noted that the new rubber tire compound values (Tables 1–3) used for these delta calculations are conservative values selected from a range of values for new tire rubber compound samples that were tested.

It is also noteworthy that reversing the order of the tandem treatment protocols does not provide equivalent results. As noted in Table 4, the compound containing 20 percent of the microwave/biotreated crumb rubber exhibited further deterioration of three of the four key-physical properties.

While not wishing to be bound by theory, it is thought that following the initial biotreatment, the subsequent microwave treatment is able to effect additional useful modifications of both the surface, and the bulk properties. The combination of the two treatments provides a synergistic effect with regard to the end product. From the data, neither treatment individually can achieve the same quality of a cured end product as is achieved by the tandem combination of the biotreated/microwave treatment protocols.

Likewise, since reversing the order of the treatment actually results in a loss of certain desirable physical properties, it is possible that the microwave treatment, so alters the crumb rubber surface that the micro organisms are unable to interact favorably with the surface of the crumb rubber particles. It is further possible that the microwave treatment may condition the rubber so that subsequent biotreatment is effective.

With respect to cured rubber mixes using rubber particles treated with the tandem biotreatment/microwave process, the overall properties of the resulting cured rubber are improved over the comparable control mix using either untreated crumb rubber or rubber treated solely with the biotreatment or microwave protocols. The improved tandem treatment significantly affects the measured parameter values such that the treated crumb rubber achieves properties more like the new tire rubber. The treated crumb rubber favor useful co-polymerization with virgin polymer stocks. As a result, the overall cured composition has many improved qualities over similar compounds using untreated crumb rubber.

It is important to note that the treated crumb rubber was evaluated at 20% loadings. The favorable results obtained at the 20% loading levels suggest that loading levels of between 25–35%, or higher, may be used and still obtain a desirable cured end product. It should also be noted that additional improvements are obtainable by selection of a desired size of crumb rubber for treatment and use. A relatively large sized crumb rubber particle was used in the present studies. However various advantages may be gained by varying the particle size. Larger size particles offer an ability to make use of the existing cured rubber properties which are present within the interior of the treated crumb rubber particle and on an economically favorable basis.

One of ordinary skill in the art of rubber compounding and rubber compositions will readily appreciate that the treated crumb rubber can be used at greater relative quantities and with larger size particles than the untreated. crumb rubber in new rubber mixes. Consequently, a rubber formulation for a new tire can make use of an increased amount of treated crumb rubber. Such a formulation enables a lower cost tire, may lessen the quantity of other fillers such as carbon black or silica, and makes use of a recycled resource which remains under utilized. The data set forth in the Examples above indicate that the tandem treatment of crumb rubber modifies the crumb rubber surface and bulk chemistry to provide a more desirable crumb rubber. The treated crumb rubber interior is believed to retain the desirable physical properties which are compatible for reformulation with a new tire polymer mix. One limiting factor which has heretofore precluded higher levels of crumb rubber involves the presence of sulfur functional groups in the surface of the crumb rubber. By targeting important constituents in the tandem, sequential treatment process, one can achieve higher loading levels of treated crumb rubber in new tire mixes and without compromising the other physical properties of the crumb rubber.

The duration of the tandem treatment of crumb rubber to achieve an effective crumb rubber suitable for combination with new rubber is readily determined by routine experimentation. Once the other operating parameters are selected, the extent of each individual treatment can be determined by performing the treatments for different durations and concentrations until a satisfactory crumb rubber is obtained as determined by use in compounding a new rubber formulation and/or by other tests described herein.

The treated crumb rubber of the present invention may be used with a variety of tire tread cap rubber compositions such as those taught in U.S. Pat. No. 5,378,754, and U.S. Pat. No. 5,023,301, which are incorporated herein by reference. For instance, the devulcanized crumb rubber may be blended with a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/ acrylonitrile copolymers, and mixtures thereof. The rubber may further contain a filler, such as carbon black, silica, and combinations thereof. The rubber and filler may then be blended with a desired amount of the treated rubber. The devulcanized rubber provides a useful component for a rubber composition suitable for tire treads and recycled rubber products.

It is also believed that in addition to useful tread compositions, for a tread base or a tread cap, the devulcanized used rubber described in the present invention may be useful in compositions used in other tire applications such as sidewalls, beads, carcass plies, and belts.

It is well within the skill level of one in the art to prepare polymer mixtures of which the devulcanized rubber particulates may be added during a compound mixing stage. Further, it is well known in the art how to construct a conventional pneumatic tire having a tread comprised of a blend of natural rubber and solution-polymerized styrene/butadiene co-polymer rubber (SBR). As taught in the current invention, substantial loading levels of devulcanized crumb rubber may be incorporated into the polymer mix prior to the production of a tire. In general, one would expect the ground contacting surfaces of a tire tread having the devulcanized crumb rubber substituted for a portion of a filler, such as carbon black, to have an improved rolling resistance, or fuel economy, as compared to a tire made having a tread compound which uses carbon black or silica as a filling agent.

For certain cured articles such as belts, hoses, or shoe treads, it may be possible to use up to a 100% treated crumb rubber content for such articles.

In applications such as tires, a formulation having a higher percentage of crumb rubber may enable a lower cost tire. At the very least, a greater use of a recycled resource is achieved. Further, the crumb rubber treatment process provides an opportunity to add a material having reinforcing properties to various components of a tire. While the data discussed above are directed primarily to tire tread formulations, a reinforcing filler such as crumb rubber may have utility in sidewall formulations and other compounded rubber portions of a cured tire.

Likewise, extensive use is made of rubber bladders in the tire manufacturing process. Such bladders may be constructed, at least in part, of a treated crumb rubber.

Additionally, the prior art use of particulate crumb rubber and various treatment protocols for modifying the crumb rubber teach the use of an extremely fine, powder-like particulate. The present invention has been found suitable for use with much larger particles, and the use of the large particles is believed to afford additional advantages in resulting cured compositions such as tires and other molded rubber products and at lower costs.

It is also envisioned that selected shapes of vulcanized crumb rubber can be treated with the above procedure to produce a treated reinforcing filler and which further provides a useful shape. For instance, while not separately reported herein, favorable indications similar to those set forth above have been obtained with tread buffings. The buffings have a substantially greater length than width and may therefore impart additional physical characteristics to a polymer mix based upon their size and dimension and at a lower cost.

Heretofore, crumb rubber recycling efforts have been directed toward a randomly shaped particle size. The present technology affords the opportunity to select a particular length, diameter, geometric shape in which the selected shape offers enhanced attributes in the tire construction. The selected shape which may be stamped or formed from larger segments or pieces of rubber, may have varying attributes of hardness, elasticity, or other cured properties which, being preserved in the treatment and subsequent polymerization process, will impart the original mechanical properties to the resulting mix.

For instance, a tandem treated crumb rubber having a selected shape and/or other physical property, such as hardness, may be blended in with a tread polymer to provide a heterogeneous tread mixture which contained therein intact particles of the treated crumb rubber. The properties of such a mixture may be advantageously different than a homogeneous mixture of blended liquid polymers.

In summary, the present invention provides an improved and economical process for treating crumb rubber to provide a treated crumb rubber having improved chemical and reactive properties. These improved properties permit the crumb rubber to be incorporated at higher loading levels and in larger sizes than untreated crumb rubber when used in new tire polymer formulations. The ability to target chemical moieties (i.e., polysulfides) on the used rubber surface with different types of devulcanization protocols is thought to improve the surface reaction rates of the treated crumb rubber in new tire mixes, thereby allowing the treated crumb rubber to be used in new rubber mixes. The biotreatment portion targets the surface of the particulate rubber. In addition, the microwave treatment portion of the process is believed to affect not only additional surface treatment and modification but has improved bulk properties as well. Further, changes to the bulk properties maintain the useful physical properties of the interior of the rubber particulate, these properties being used to advantage by the incorporation of larger particle sizes into a resulting polymer formulation.

In view of the foregoing disclosure and examples, it is well within the ability of one skilled in the relevant art to make modifications and variations to the disclosed embodiments and examples, including the use of equivalent and even dissimilar materials and process steps without departing from the spirit of the invention.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

TABLE 1

|  | New Tire Rubber Compound | 20% Untreated Crumb Rubber Compound | 20% Biotreated Crumb Rubber Compound | | | |
| --- | --- | --- | --- | --- | --- | --- |
|  |  |  | CF83 20 hrs | CF86 5 hrs | CF104 40 hrs | CF108 10 hrs |
| Uncured Properties |  |  |  |  |  |  |
| Plasticity, Mooney units | 60.5 | 87.3 | 73.0 | 69.2 | 80.6 | 86.4 |
| Scorch |  |  |  |  |  |  |
| (t5), minutes | 24.58 | 20.26 | 19.90 | 19.90 | 19.53 | 20.12 |
| (t35), minutes | 28.62 | 24.47 | 24.37 | 25.28 | 23.43 | 23.70 |
| Min. Viscosity, Mooney units | 41.24 | 62.67 | 50.67 | 47.80 | 66.51 | 61.99 |

TABLE 1-continued

|  | New Tire Rubber Compound | 20% Untreated Crumb Rubber Compound | 20% Biotreated Crumb Rubber Compound | | | |
|---|---|---|---|---|---|---|
|  |  |  | CF83 20 hrs | CF86 5 hrs | CF104 40 hrs | CF108 10 hrs |
| Cured Properties |  |  |  |  |  |  |
| Shore Hardness | 67.7 | 66.1 | 66.9 | 67.7 | 66.5 | 66.4 |
| Modulus at 100%, MPa | 2.43 | 2.02 | 2.07 | 2.13 | 2.04 | 2.01 |
| Modulus at 300%, MPa | 3.44 | 2.66 | 2.46 | 2.12 | 2.46 | 2.53 |
| Tensile Strength, MPa | 21.51 | 16.38 | 16.56 | 13.37 | 16.44 | 15.80 |
| Elongation @ break, % | 421 | 414 | 449 | 441 | 445 | 423 |
| Energy @ break, Joules | 16.64 | 12.54 | 14.60 | 12.49 | 14.37 | 12.79 |
| G' (10%), MPa | 2.679 | 2.935 | 3.118 | 3.461 | 3.004 | 2.974 |
| Tan delta | 0.288 | 0.275 | 0.314 | 0.338 | 0.307 | 0.300 |
| Analytical Characterization |  |  |  |  |  |  |
| Acetone Extract, % by weight | 10.34 | 10.26 | 9.57 | 9.93 | 10.15 | 9.94 |
| Oxygen, % by weight | 1.63 | 1.42 | 1.48 | 1.68 | 1.43 | 1.36 |
| Polymer ratio | 100 SBR |  | 100 SBR/trNR | 100 SBR | 100 SBR/trNR | 100 SBR/trNR |
| Zinc Oxide, % by weight | 2.79 | 2.55 | 2.57 | 2.51 | 2.54 | 2.52 |
| Macro Ash, % by weight | 3.01 | 3.44 | 3.67 | 3.68 | 3.50 | 3.08 |

TABLE 2

|  |  |  | Bio Wave | | | |
|---|---|---|---|---|---|---|
|  | New Tire Rubber Compound | 20% Untreated Crumb Rubber Compound | 20% Microwave-Treated Crumb Rubber Compound | | | |
|  |  |  | 403604 | 403804 | 403608 | 403808 |
| Uncured Properties |  |  |  |  |  |  |
| Plasticity, Mooney units | 60.5 | 87.3 | 71.7 | 75.6 | 76.2 | 73.8 |
| Scorch |  |  |  |  |  |  |
| (t5), minutes | 24.58 | 20.26 | 22.55 | 23.57 | 23.95 | 24.15 |
| (t35), minutes | 28.62 | 24.47 | 26.37 | 27.42 | 28.32 | 28.60 |
| Min. Viscosity, Mooney units | 41.24 | 62.67 | 49.03 | 52.25 | 52.47 | 50.97 |
| Cured Properties |  |  |  |  |  |  |
| Shore Hardness | 67.7 | 66.1 | 68.2 | 70.4 | 67.0 | 67.9 |
| Modulus at 100%, MPa | 2.43 | 2.02 | 2.17 | 2.51 | 2.12 | 2.20 |
| Modulus at 300%, MPa | 3.44 | 2.66 | 2.53 | 2.91 | 2.72 | 2.71 |
| Tensile Strength, MPa | 21.51 | 16.38 | 16.74 | 17.16 | 17.28 | 17.27 |
| Elongation @ break, % | 421 | 414 | 431 | 404 | 425 | 425 |
| Energy @ break, Joules | 16.64 | 12.54 | 14.29 | 13.47 | 13.86 | 13.95 |
| G' (10%), MPa | 2.679 | 2.935 | 3.24 | 3.45 | 3.06 | 3.17 |
| Tan delta | 0.288 | 0.275 | 0.291 | 0.301 | 0.289 | 0.295 |
| Analytical Characterization |  |  |  |  |  |  |
| Acetone Extract, % by weight | 10.34 | 10.26 | 10.82 | 10.89 | 11.25 | 11.37 |
| Oxygen, % by weight | 1.63 | 1.42 | 1.14 | 1.13 | 1.17 | 1.14 |
| Polymer ratio | 100 SBR |  | 3 NR/97 SBR | trNR/100 SBR | 3 NR/97 SBR | 3 NR/97 SBR |
| Zinc Oxide, % by weight | 2.79 | 2.55 | 2.00 | 2.07 | 1.95 | 1.94 |
| Macro Ash, % by weight | 3.01 | 3.44 | 3.80 | 4.20 | 3.77 | 3.95 |

TABLE 3

|  | New Tire Rubber Compound | 20% Untreated Crumb Rubber Compound | 20% Bio/Microwave-Treated Crumb Rubber Compound | 20% Microwave/Biotreated Crumb Rubber Compound |
|---|---|---|---|---|
| Uncured Properties |  |  |  |  |
| Plasticity, Mooney units | 60.5 | 87.3 | 73.0 | 77.7 |
| Scorch |  |  |  |  |
| (t5), minutes | 24.58 | 20.26 | 20.22 | 23.68 |
| (t35), minutes | 28.62 | 24.47 | 23.35 | 30.00 |
| Min. Viscosity, Mooney units | 41.24 | 62.67 | 50.10 | 53.53 |

TABLE 3-continued

| | New Tire Rubber Compound | 20% Untreated Crumb Rubber Compound | 20% Bio/Microwave-Treated Crumb Rubber Compound | 20% Microwave/Biotreated Crumb Rubber Compound |
|---|---|---|---|---|
| Cured Properties | | | | |
| Shore Hardness | 67.7 | 66.1 | 64.5 | 71.6 |
| Modulus at 100%, MPa | 2.43 | 2.02 | 1.79 | 2.43 |
| Modulus at 300%, MPa | 3.44 | 2.66 | 2.13 | 1.88 |
| Tensile Strength, MPa | 21.51 | 16.38 | 17.93 | 10.51 |
| Elongation @ break, % | 421 | 414 | 500 | 351 |
| Energy @ break, Joules | 16.64 | 12.54 | 16.89 | 7.65 |
| G' (10%), MPa | 2.679 | 2.935 | 2.582 | 3.670 |
| Tan delta | 0.288 | 0.275 | 0.322 | 0.321 |
| Analytical Characterization | | | | |
| Acetone Extract, % by weight | 10.34 | 10.26 | 10.52 | 10.17 |
| Oxygen, % by weight | 1.63 | 1.42 | 1.68 | 2.05 |
| Polymer ratio | 100 SBR | | 100 SBR | 100 SBR |
| Zinc Oxide, % by weight | 2.79 | 2.55 | 2.68 | 2.76 |
| Macro Ash, % by weight | 3.01 | 3.44 | 3.80 | 3.74 |

TABLE 4

Delta Value Table Description - Bio Wave Patent Application

| | 20% Bio/Microwave Treated Crumb Rubber Compound | 20% Microwave/Biotreated Crumb Rubber Compound |
|---|---|---|
| Plasticity | 53% | 36% |
| Tensile Strength | 30% | −114% |
| Elongation @ break | >200% | >−200% |
| Energy @ break | 106% | −119% |

What is claimed is:

1. A process for devulcanizing particulate rubber comprising:
   providing a supply of crumb rubber;
   exposing the crumb rubber to chemolithotrophic microorganisms and at a treatment temperature of between about 50° C. to about 70° C.;
   reacting chemical constituents on the surface of the crumb rubber by the metabolic activity of said microorganisms;
   further exposing the crumb rubber to microwave radiation;
   further reacting chemical constituents on the surface and interior of the crumb rubber by exposure to a combination of microwave energy and heat; and,
   thereby, providing a crumb rubber having improved chemical properties for incorporation into a new rubber mix.

2. The process according to claim 1 wherein said microorganisms are isolates of a natural sulfur hot spring environment.

3. The process according to claim 1 wherein said microwave frequency is 2450 MHZ.

4. The process according to claim 1 comprising an additional step of heating said crumb rubber to a temperature of between about 350° C. and about 400° C.

5. The process according to claim 4 wherein said step of heating further comprises heating a susceptor material in proximity with said crumb rubber.

6. The process according to claim 1 wherein said step of exposing said crumb rubber to microwave radiation further comprises providing an atmosphere of an inert gas.

7. The process according to claim 1 wherein said step of providing a supply of crumb rubber further comprises supplying crumb rubber having an average mesh size of at least about 40.

8. The process according to claim 1 wherein said step of providing a supply of crumb rubber further comprises supplying crumb rubber having an average mesh size of at least about 80.

9. A process for treating used rubber to render it suitable for use at high loading levels in a new rubber composition comprising:
   treating the used rubber with an exposure to biotreatment with microorganisms followed by exposure to microwave radiation for a sufficient period of time to provide a surface having an altered chemical state having improved reactivity when compounded into new rubber products.

10. A process of combining particulate rubber with new rubber, comprising the steps of:
   providing a plurality of scrap particles of vulcanized crumb rubber, the particles having an average particle size of between about 200 to about 40 mesh;
   oxidizing sulfur-containing vulcanization products on the surface of the crumb rubber particles with a sulfur metabolizing bacterium followed by exposure to a combination of microwave radiation and radiant heat, the interior of the crumb rubber particles retaining desirable mechanical properties;
   combining the surface oxidized particles with new rubber; and,
   forming cross-link bonds between the new rubber and the surface of the oxidized rubber particles.

* * * * *